(12) United States Patent
Yamanaka

(10) Patent No.: US 11,912,009 B2
(45) Date of Patent: Feb. 27, 2024

(54) SOUND INSULATION MATERIAL AND METHOD OF PRODUCING SOUND INSULATION MATERIAL

(71) Applicant: Archem Inc., Tokyo (JP)

(72) Inventor: Yusuke Yamanaka, Tokyo (JP)

(73) Assignee: Archem Inc., Tokyo (JP)

( * ) Notice: Subject to any disclaimer, the term of this patent is extended or adjusted under 35 U.S.C. 154(b) by 407 days.

(21) Appl. No.: 17/293,481

(22) PCT Filed: Oct. 15, 2019

(86) PCT No.: PCT/JP2019/040480
§ 371 (c)(1),
(2) Date: May 13, 2021

(87) PCT Pub. No.: WO2020/110488
PCT Pub. Date: Jun. 4, 2020

(65) Prior Publication Data
US 2022/0048275 A1     Feb. 17, 2022

(30) Foreign Application Priority Data

Nov. 28, 2018   (JP) ................. 2018-222665

(51) Int. Cl.
*B32B 5/24*     (2006.01)
*B29C 43/00*    (2006.01)
(Continued)

(52) U.S. Cl.
CPC ............ *B32B 5/245* (2013.01); *B29C 43/003* (2013.01); *B29C 43/203* (2013.01); *B29C 43/52* (2013.01);
(Continued)

(58) Field of Classification Search
CPC ........... B32B 5/245; B32B 3/263; B32B 3/28; B32B 5/022; B32B 5/18; B32B 7/02;
(Continued)

(56) References Cited

U.S. PATENT DOCUMENTS 10,471,676 B1 *  11/2019  Whipple ................. B32B 25/10
11,052,580 B2     7/2021  Lemaire et al.
(Continued)

FOREIGN PATENT DOCUMENTS

CN       103339669 A       10/2013
DE    102016222328 A1        5/2018
(Continued)

OTHER PUBLICATIONS

May 25, 2021, International Preliminary Report on Patentability issued in the International Patent Application No. PCT/JP2019/040480.

(Continued)

*Primary Examiner* — Forrest M Phillips
(74) *Attorney, Agent, or Firm* — KENJA IP LAW PC

(57) ABSTRACT

A sound insulation material 1 includes a first layer 10 constituted by a polyurethane foam, a second layer 20 that is laminated on a surface of the first layer, the surface being located on a first side, and that is constituted by a sheet-shaped member made from a material other than polyurethane, and a third layer 30 that is laminated on a surface of the second layer, the surface being located on the first side, that is constituted by a polyurethane foam, and that, over its entirety, has a higher density than the density of at least a portion of the first layer.

14 Claims, 7 Drawing Sheets

(51) Int. Cl.
| | |
|---|---|
| *B29C 43/20* | (2006.01) |
| *B29C 43/52* | (2006.01) |
| *B32B 3/26* | (2006.01) |
| *B32B 3/28* | (2006.01) |
| *B32B 5/02* | (2006.01) |
| *B32B 5/18* | (2006.01) |
| *B32B 7/02* | (2019.01) |
| *B32B 37/18* | (2006.01) |
| *G10K 11/00* | (2006.01) |
| *B29K 75/00* | (2006.01) |
| *B29K 105/04* | (2006.01) |
| *B29K 105/12* | (2006.01) |
| *B60R 13/08* | (2006.01) |

(52) U.S. Cl.
CPC .............. *B32B 3/263* (2013.01); *B32B 3/28* (2013.01); *B32B 5/022* (2013.01); *B32B 5/18* (2013.01); *B32B 7/02* (2013.01); *B32B 37/185* (2013.01); *G10K 11/002* (2013.01); *B29K 2075/00* (2013.01); *B29K 2105/04* (2013.01); *B29K 2105/128* (2013.01); *B29K 2995/0002* (2013.01); *B32B 2262/0276* (2013.01); *B32B 2266/0278* (2013.01); *B32B 2305/022* (2013.01); *B32B 2307/102* (2013.01); *B32B 2307/72* (2013.01); *B32B 2307/732* (2013.01); *B32B 2367/00* (2013.01); *B32B 2375/00* (2013.01); *B32B 2605/00* (2013.01); *B60R 13/0838* (2013.01)

(58) Field of Classification Search
CPC .......... B32B 37/185; B32B 2262/0276; B32B 2266/0278; B32B 2305/022; B32B 2307/102; B32B 2307/72; B32B 2307/732; B32B 2367/00; B32B 2375/00; B32B 2605/00; B29C 43/003; B29C 43/203; B29C 43/52; G10K 11/002; B29K 2075/00; B29K 2105/04; B29K 2105/128; B29K 2995/0002; B60R 13/0838
See application file for complete search history.

(56) References Cited

U.S. PATENT DOCUMENTS

| | | | |
|---|---|---|---|
| 2004/0231915 A1* | 11/2004 | Thompson, Jr. ...... | B32B 27/065 181/290 |
| 2008/0073146 A1* | 3/2008 | Thompson, Jr. ...... | B60R 13/011 181/290 |
| 2012/0146259 A1 | 6/2012 | Nishikawa et al. | |
| 2012/0220677 A1 | 8/2012 | Williams et al. | |
| 2014/0027200 A1 | 1/2014 | Mori et al. | |
| 2016/0152739 A1 | 6/2016 | Eilbracht et al. | |
| 2019/0136005 A1 | 5/2019 | Williams et al. | |
| 2019/0211570 A1* | 7/2019 | Vogt .................... | E04F 15/0215 |
| 2020/0001804 A1 | 1/2020 | Lemaire et al. | |

FOREIGN PATENT DOCUMENTS

| | | |
|---|---|---|
| FR | 3049894 A1 | 10/2017 |
| JP | H06127436 A | 5/1994 |
| JP | 2000007591 A | 1/2000 |
| JP | 2006316788 A | 11/2006 |
| JP | 2010014841 A | 1/2010 |
| JP | 2011002523 A | 1/2011 |
| JP | 2017167251 A | 9/2017 |
| JP | 2017222873 A | 12/2017 |
| WO | 2016116684 A1 | 7/2016 |
| WO | 2017159646 A1 | 9/2017 |
| WO | 2018002457 A1 | 1/2018 |

OTHER PUBLICATIONS

Nov. 26, 2019, International Search Report issued in the International Patent Application No. PCT/JP2019/040480.

Jul. 15, 2022, search result of the Extended European Search Report issued by the European Patent Office in the corresponding European Patent Application No. 19889677.1.

Oct. 30, 2023, search result of Office Action issued by the China National Intellectual Property Administration in the corresponding Chinese Patent Application No. 201980078884.3.

* cited by examiner

… (1)

SOUND INSULATION MATERIAL AND METHOD OF PRODUCING SOUND INSULATION MATERIAL

TECHNICAL FIELD

The present disclosure relates to a sound insulation material and a method of producing a sound insulation material.

The present application claims the priority based on Japanese Patent Application No. 2018-222665 filed on Nov. 28, 2018 in Japan, the content of which is herein incorporated in its entirety.

BACKGROUND

There has been a conventional sound insulation material constituted by a monolayer structure of a polyurethane foam (for example, PTL 1).

CITATION LIST

Patent Literature

PTL 1: Japanese Patent Laid-Open No. 2006-316788

SUMMARY

Technical Problem

However, there has been room for improvement in sound insulation performance of such a conventional sound insulation material.

An object of the present disclosure is to provide a sound insulation material that can allow sound insulation performance to be enhanced, and a method of producing a sound insulation material, which can obtain a sound insulation material that can allow sound insulation performance to be enhanced.

Solution to Problem

A sound insulation material of the present disclosure includes
 a first layer constituted by a polyurethane foam,
 a second layer that is laminated on a surface of the first layer, the surface being located on a first side, and that is constituted by a sheet-shaped member made from a material other than polyurethane, and
 a third layer that is laminated on a surface of the second layer, the surface being located on the first side, that is constituted by a polyurethane foam, and that, over its entirety, has a higher density than a density of at least a portion of the first layer.

A method of producing a sound insulation material of the present disclosure includes
 a first layer production step of obtaining a first layer constituted by a polyurethane foam,
 a second layer preparation step of preparing a second layer constituted by a sheet-shaped member made from a material other than polyurethane,
 a third layer production step of thermally compressing a polyurethane foam not thermally compressed, thereby obtaining a third layer, over its entirety, having a higher density than a density of any portion of the first layer obtained in the first layer production step, and
 a lamination step of laminating the second layer prepared in the second layer preparation step, on a surface of the first layer obtained in the first layer production step, the surface being located on a first side, and laminating the third layer obtained in the third layer production step, on a surface of the second layer, the surface being located on the first side, thereby obtaining a laminated body.

Advantageous Effect

According to the present disclosure, there can be provided a sound insulation material that can allow sound insulation performance to be enhanced, and a method of producing a sound insulation material, which can obtain a sound insulation material that can allow sound insulation performance to be enhanced.

DETAILED DESCRIPTION

Figure 1:
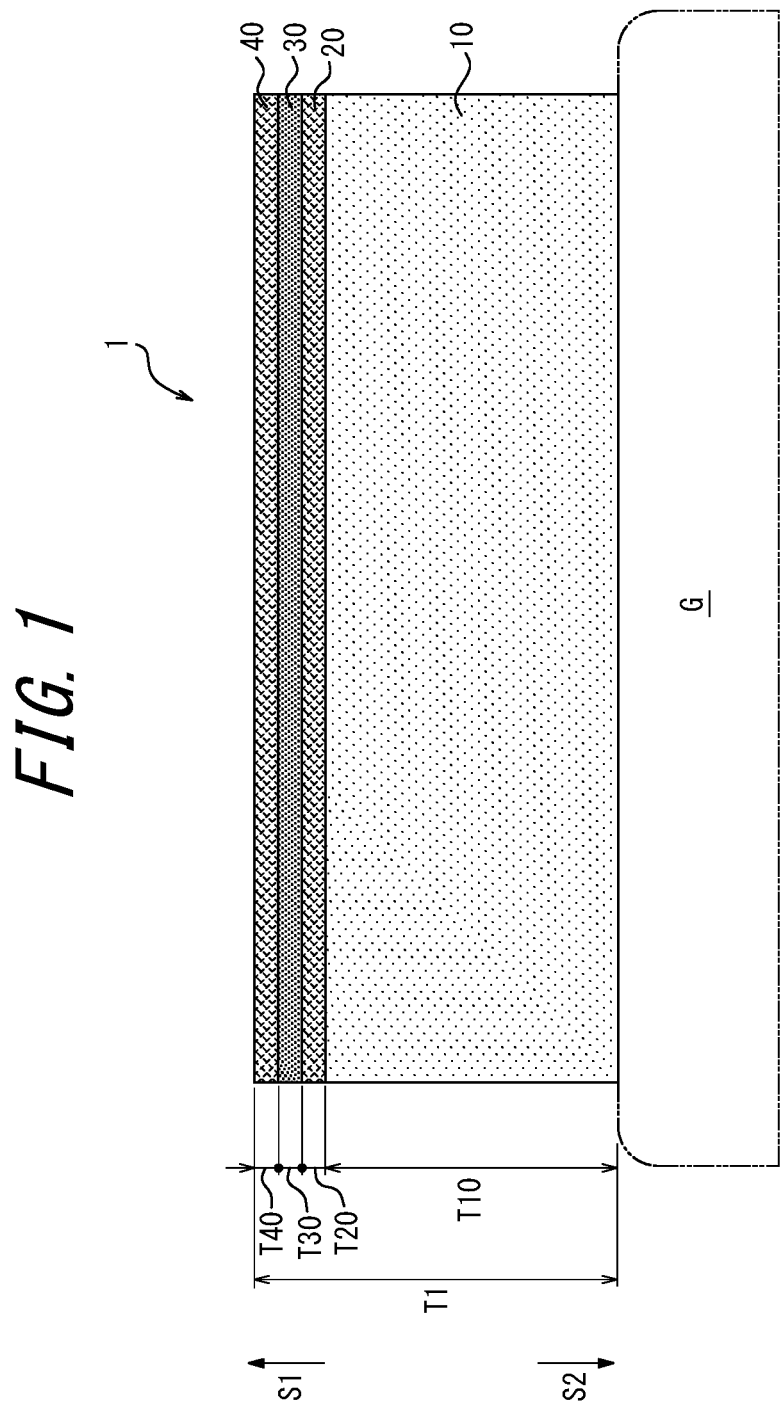
FIG. 1 is a cross-sectional view schematically illustrating a sound insulation material according to a first embodiment of the present disclosure.

The sound insulation material of the present disclosure may be used in any location and/or article, and is preferably used in a vehicle.

Hereinafter, embodiments of the sound insulation material and the method of producing a sound insulation material, according to the present disclosure, will be exemplified and described with reference to the drawings.

The same symbols are given to components that are common in the drawings.

First Embodiment

Figure 2:
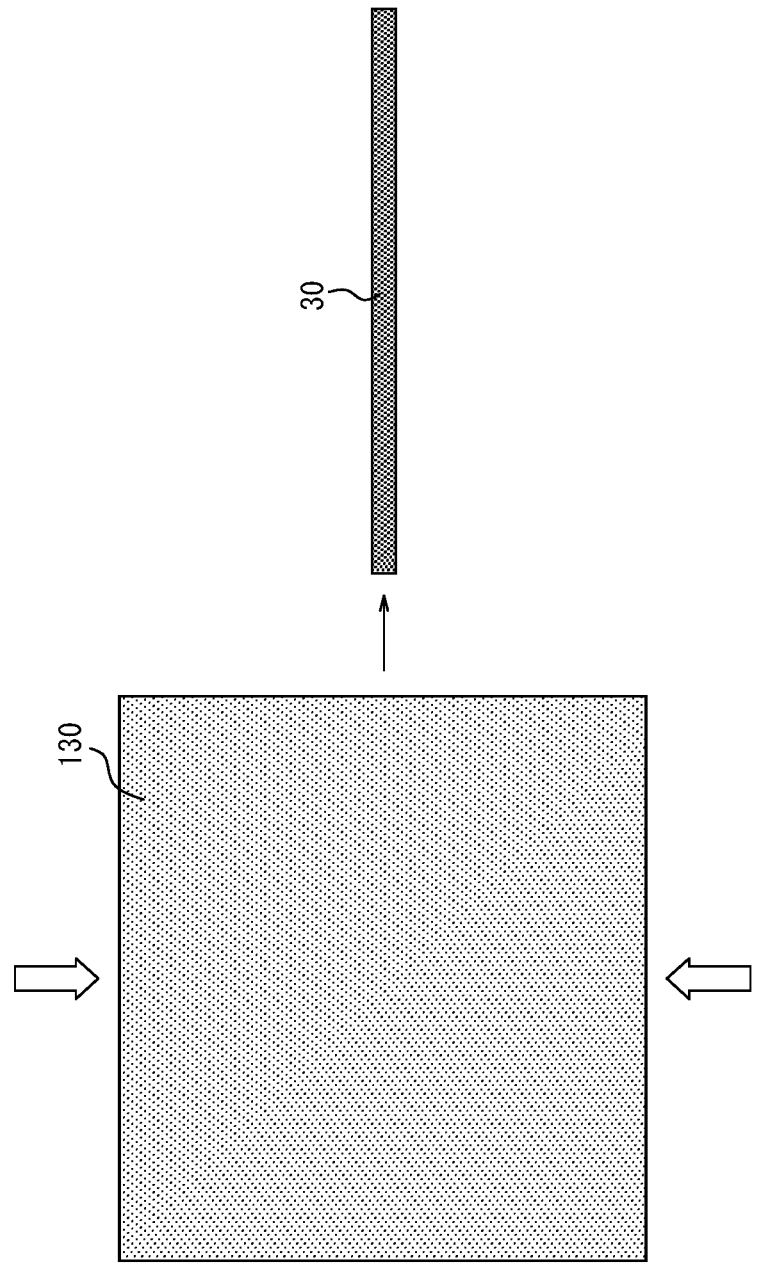
FIG. 2 is a view for describing a third layer production step in a method of producing a sound insulation material, according to the first embodiment of the present disclosure.
Figure 3:
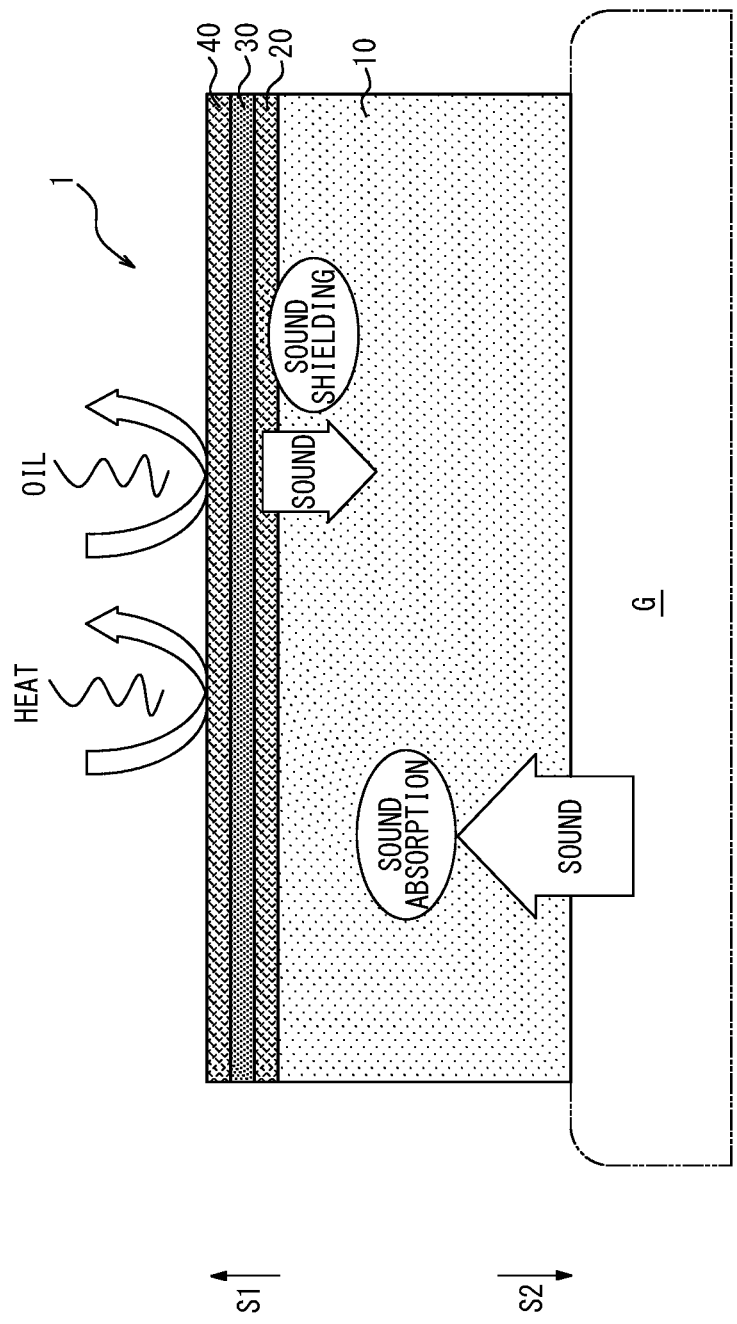
FIG. 3 is a view for describing the effects by the sound insulation material of FIG. 1.

FIG. 1 to FIG. 3 are each a view for describing a sound insulation material 1 and a method of producing the same, according to a first embodiment of the present disclosure.

FIG. 1 illustrates a cross section of the sound insulation material 1 according to the first embodiment of the present disclosure. The sound insulation material 1 of the present embodiment is constituted by a laminate structure in which a plurality of (specifically, four in the present example) layers are laminated.

Herein, one side (the upper side in FIG. 1) in the lamination direction of the sound insulation material 1 (which also serves as the thickness direction of the sound insulation material 1.) is referred to as "first side (S1)" and another side (the lower side in FIG. 1) in the lamination direction is referred to as "second side (S2)", for convenience. In the example of FIG. 1, when the sound insulation material 1 is used, the lamination direction thereof corresponds to the vertical direction, the first side S1 thereof corresponds to the upper side in the vertical direction, and the second side S2 thereof corresponds to the lower side in the vertical direction. However, when the sound insulation material 1 is used, the lamination direction thereof, and the respective directions and orientations thereof at the first side S1 and the second side S2 may be different from those in the example of FIG. 1.

The sound insulation material 1 is disposed so that, when used, a surface thereof, the surface being located on the second side S2, is opposite to a sound source generator G, as in the example of FIG. 1. The sound insulation material 1 is configured so that, when thus disposed, inhibits any sound generated from the sound source generator G from being transmitted toward the first side S1 rather than the sound insulation material 1. Such performance exhibited by the sound insulation material 1, which allows any sound from the sound source generator G to be inhibited from being transmitted toward the first side S1 rather than the sound insulation material 1, is herein referred to as "sound insulation performance".

The sound insulation material 1 is preferably disposed so that, when used, a surface thereof, the surface being located on the second side S2, is in contact with the sound source generator G, as in the example of FIG. 1, from the viewpoint of an enhancement in sound insulation performance.

The sound source generator G may be any article, and is preferably a component that constitutes a vehicle. In the present example, the sound source generator G is disposed in an engine room of a vehicle. In the present example, the sound insulation material 1 is placed on the sound source generator G with being in contact therewith.

The sound insulation material 1 of the present embodiment includes a first layer 10 as a surface layer that is located closest to the second side S2, a second layer 20 that is laminated on a surface of the first layer 10, the surface being located on the first side S1, a third layer 30 that is laminated on a surface of the second layer 20, the surface being located on the first side S1, and a fourth layer 40 that is laminated on a surface of the third layer 30, the surface being located on the first side S1, and that is a surface layer located closest to the first side S1.

In the example of FIG. 1, the first layer 10, the second layer 20, the third layer 30, and the fourth layer 40 are each configured in a plate-shaped manner, in other words, are each, over its entirety, not only substantially constant in thickness, but also flat. A surface (a surface of the first layer 10, located on the second side S2) of the sound insulation material 1, the surface being located on the second side S2, is accordingly flat. Such a configuration is particularly preferable because, in a case where a surface (the upper surface in FIG. 1) of the sound source generator G, the surface being facing the sound insulation material 1 (located on the first side S1), is flat as in the example of FIG. 1, the area of contact between the sound insulation material 1 and the sound source generator G can be increased, and consequentially sound insulation performance can be enhanced.

The first layer 10, the second layer 20, the third layer 30, and the fourth layer 40 are preferably mutually fixed (for example, bonded or welded) among such layers, on at least respective parts thereof (for example, only the outer circumferential end portion of each of the layers). Thus, the layers 10 to 40 of the sound insulation material 1 can be prevented from being mutually separated when the sound insulation material 1 is, for example, conveyed and/or used.

However, the first layer 10 to the fourth layer 40 may be mutually unfixed.

The first layer 10 is constituted by a polyurethane foam. The polyurethane foam constituting the first layer 10 is herein referred to as "first polyurethane foam".

In the present embodiment, the first layer 10 is, over its entirety, substantially uniform in density (kg/m$^3$).

The first polyurethane foam constituting the first layer 10 is a usual polyurethane foam not thermally compressed.

The first layer 10 (hence the first polyurethane foam) has a structure where a large number of cells (not collapsed) are aligned, and thus is high in performance of absorption of any incoming sound (hereinafter, referred to as "sound absorption performance".).

The third layer 30 is constituted by a polyurethane foam. The polyurethane foam constituting the third layer 30 is herein referred to as "third polyurethane foam".

In the present embodiment, the third layer 30 is, over its entirety, substantially uniform in density (kg/m$^3$). The third layer 30, over its entirety, has a higher density (kg/m$^3$) than that of any part of the first layer 10.

In the present example, the third layer 30 (third polyurethane foam) is constituted by a polyurethane foam thermally compressed (polyurethane foam that is thermally compressed). That is, the third layer 30 is obtained by thermally compressing a block 130 constituted by a usual polyurethane foam not thermally compressed, as schematically illustrated in FIG. 2. Hereinafter, the polyurethane foam not thermally compressed, constituting the block 130, is referred to as "fourth polyurethane foam". In the present example, the third layer 30 is obtained by thermal compression in the thickness direction thereof.

As described above, the third layer 30 (hence the third polyurethane foam) is higher in density (kg/m$^3$) than the first layer 10. Thus, the third layer 30, when compared at the same volume, is smaller in amount of voids therein than the first layer 10, and thus is lower in sound absorption performance but higher in rebounding performance of any sound that tries to come into (hereinafter, referred to as "sound shielding performance".). In the present example, the third layer 30 is constituted by a polyurethane foam thermally compressed, thus is provided with cells collapsed and has almost no or no voids therein, and therefore has almost no sound absorption performance, but is high in sound shielding performance. The third layer 30 is higher in damping performance of vibration than the first layer 10.

The second layer 20 is made from a material other than polyurethane, and is constituted by a sheet-shaped member configured in the form of a sheet.

The second layer 20 is made from a material other than polyurethane, in other words, is made from a material different from those of the first layer 10 and the third layer 30, and thus can allow sound insulation performance of the sound insulation material 1 to be enhanced as compared with a case where no second layer 20 is located between the first layer 10 and the third layer 30 and the first layer 10 and the third layer 30 are in direct contact with each other. More specifically, the discloser of the present disclosure has newly focused on the following: in a case where no second layer 20 is located between the first layer 10 and the third layer 30, sound insulation performance may be deteriorated in the case of input of force of any sound at a particular frequency from the sound source generator G to the sound insulation material 1, as compared with the case of input of force of any sound at other frequency. The reason for this is considered to be because such sound at a particular frequency is amplified due to resonance of the respective polyurethane foams (first polyurethane foam and third polyurethane foam) constituting the first layer 10 and the third layer 30. The discloser of the present disclosure has newly found that a second layer 20 constituted by a material other than polyurethane can be provided between the first layer 10 and the third layer 30, thereby allowing sound insulation performance to be enhanced in the case of input of force of such sound at a particular frequency. The reason for this is considered to be because the second layer 20 is interposed between the first layer 10 and the third layer 30, thereby inhibiting the respective polyurethane foams (first polyurethane foam and third polyurethane foam) constituting the first layer 10 and the third layer 30 from being resonated in the case of input of force of such sound at a particular frequency.

The material constituting the second layer 20 (hence the sheet-shaped member) is, for example, preferably a resin (for example, a synthetic resin such as polyester) other than polyurethane, a plant fiber (for example, cotton), rubber, or a metal, from the viewpoint of an enhancement in sound insulation performance, and furthermore is particularly preferably a resin (for example, a synthetic resin such as polyester) other than polyurethane, a plant fiber (for example, cotton), or rubber, from the viewpoint of a decrease in weight. The structure of the second layer 20 (hence the sheet-shaped member) may be any structure as long as it is a sheet shape, and is preferably, for example, a fabric (textile, knit, or non-woven fabric), a mesh-like sheet having a large number of through holes, or a seamless sheet having no through holes, particularly preferably a non-woven fabric.

In the example of the drawing, the second layer 20 is constituted by a polyester non-woven fabric.

The fourth layer 40 is constituted by a non-woven fabric. The material constituting the non-woven fabric may be any material, and examples thereof include polyester.

The non-woven fabric constituting the fourth layer 40 is higher in oil resistance and heat resistance than the first layer 10 and the third layer 30 each constituted by a polyurethane foam.

The effects of the present embodiment are here described.

First, in the present embodiment, the third layer 30 high in sound shielding performance is disposed closer to the first side S1 than the first layer 10 high in sound absorption performance, as described above. In the present example, the sound insulation material 1 of the present embodiment is disposed so that a surface of the sound insulation material 1, the surface being located on the second side S2, is opposite to (more specifically contacted with) the sound source generator G. Thus, any sound coming perpendicular to the sound insulation material 1 (in other words, in the lamination direction) from the sound source generator G toward the first side S1 is partially absorbed by the first layer 10 and any sound not absorbed by the first layer 10 is shielded by the third layer 30 (rebounded toward the second side S2), as schematically illustrated in FIG. 3. Thus, any sound generated from the sound source generator G can be effectively inhibited from being transmitted toward the first side S1 rather than the sound insulation material 1.

The sound insulation material generally tends to be higher in sound shielding performance, and thus higher in sound insulation performance, as the weight thereof is higher. In the present embodiment, the first layer 10 (hence the first polyurethane foam) is lower in density (kg/m$^3$) than the third layer 30 (hence the third polyurethane foam). Thus, generally speaking, the first layer 10, if compared at the same volume, has the advantage of being lighter in weight, whereas it has the disadvantage of being lower in sound insulation performance, than the third layer 30. Accordingly, if the first layer 10 (hence the first polyurethane foam) constitutes the entire section having a thickness corresponding to the total thickness of the first layer 10 and the third layer 30, the sound insulation material 1 can be decreased in weight, whereas it is unlikely to cause any sound to be sufficiently inhibited from being transmitted from the sound source generator G toward the first side S1 rather than the sound insulation material 1 (in other words, it is unlikely to obtain sufficient sound insulation performance). On the other hand, if the third layer 30 (hence the third polyurethane foam) constitutes the entire section having a thickness corresponding to the total thickness of the first layer 10 and the third layer 30, any sound from the sound source generator G can be effectively shielded (rebounded) and any sound from the sound source generator G can be effectively inhibited from being transmitted toward the first side S1 rather than the sound insulation material 1 (high sound insulation performance is obtained), whereas the weight of the sound insulation material 1 is likely to be significantly increased. In particular, in a case where the sound insulation material 1 is used in a vehicle as in the present example, the weight of the sound insulation material 1 is preferably light from the viewpoint of low fuel efficiency. The sound insulation material 1 of the present embodiment includes both the first layer 10 high in sound absorption performance and the third layer 30 high in sound shielding performance, and thus the sound insulation material 1 not only can be suppressed in increase of the weight thereof, but also can obtain favorable sound insulation performance.

The sound insulation material 1 of the present embodiment can also allow any vibration generated from the sound source generator G to be effectively damped because the third layer 30 constituted by the third polyurethane foam has high vibration damping performance.

In the present example, the sound insulation material 1 of the present embodiment, in which the third layer 30 constituted by the third polyurethane foam is disposed at the first side S1 relative to the first layer 10 constituted by the first polyurethane foam, thus allows more of any sound generated from the sound source generator G to come perpendicular to the first layer 10 (in the lamination direction) and to be absorbed as compared with the reverse case, in other words, a case where the first layer 10 constituted by the first polyurethane foam is disposed at the first side S1 relative to the third layer 30 constituted by the third polyurethane foam, and thus can allow sound absorption performance by the first layer 10 to be more effectively exhibited, and as a result, sound insulation performance of the sound insulation material 1 can be enhanced.

As described above, the second layer 20 constituted by a material other than polyurethane is provided between the first layer 10 and the third layer 30 in the sound insulation material 1 of the present embodiment. Thus, any resonance between the first layer 10 and the third layer 30 can be suppressed and sound insulation performance can be enhanced upon the input of force of any sound at a particular frequency from the sound source generator G, as compared with a case where no second layer 20 is tentatively present between the first layer 10 and the third layer 30. Accordingly, the sound insulation material 1 of the present embodiment can obtain high sound insulation performance with respect to any sound in a wider frequency range.

The second layer 20 is constituted by the sheet-shaped member and thus the sound insulation material 1 can be inhibited from being increased in thickness and weight.

The function of an enhancement in sound insulation performance with the second layer 20 is particularly favorably exhibited in a case where the second layer 20 is constituted by a non-woven fabric as in the present example.

The sound insulation material 1 of the present embodiment, in which a surface layer located closest to the first side S1 is configured from a fourth layer 40 constituted by a non-woven fabric high in oil resistance and heat resistance, thus can allow each layer (first layer 10, second layer 20, and third layer 30) located on the second side S2 relative to the fourth layer 40 in the sound insulation material 1 to be effectively protected by the fourth layer 40, from oil and high heat. Thus, oil resistance and heat resistance of the sound insulation material 1 can be enhanced. Such a configuration is particularly preferable in a case where the sound insulation material 1 is disposed in a location such as an interior of an engine room of a vehicle, in particular, the sound insulation material 1 is disposed in a location which is highly likely to be exposed to oil and/or high heat, as in the present example.

Herein, the sound insulation material 1 may have any configuration different from that of the example of FIG. 1 as long as it includes at least the above first layer 10 to third layer 30. For example, the sound insulation material 1 may or may not include the fourth layer 40, and/or may have a third layer 30 that serves as a surface layer located closest to the first side S1. Alternatively, the sound insulation material 1 may include a fourth layer 40 constituted by a material other than a non-woven fabric.

Next, the method of producing the sound insulation material according to the first embodiment of the present disclosure is described. The method of producing the sound insulation material according to the present embodiment is preferable when used for production of the sound insulation material 1 according to the first embodiment. Hereinafter, a case will be described where the sound insulation material 1 of the example of FIG. 1 is produced.

A first layer 10, a second layer 20, a third layer 30, and a fourth layer 40 are obtained respectively (a first layer production step, a second layer preparation step, a third layer production step, and a fourth layer preparation step, respectively).

In the first layer production step, a first polyurethane foam is first produced, and thereafter the resulting first polyurethane foam is cut to predetermined shape and dimension, thereby obtaining a first layer 10. The first layer 10 (hence the first polyurethane foam) obtained in the first layer production step is, over its entirety, substantially uniform in density.

In the second layer preparation step, a sheet-shaped member (polyester non-woven fabric in the example of FIG. 1) made from a material other than polyurethane, produced in advance, is cut to predetermined shape and dimension, thereby preparing a second layer 20.

In the third layer production step, a fourth polyurethane foam not thermally compressed is first produced. Thereafter, the resulting fourth polyurethane foam is cut to predetermined shape and dimension, thereby obtaining a block 130 including the fourth polyurethane foam. Next, the block 130 is thermally compressed in one direction and thus thinned, thereby obtaining a third layer 30 including a third polyurethane foam (FIG. 2). The third layer 30 (hence the third polyurethane foam) obtained in the third layer production step is, over its entirety, substantially uniform in density, and, over its entirety, has a higher density than that of any portion of the first layer 10 (hence the first polyurethane foam) obtained in the first layer production step.

In the fourth layer preparation step, a non-woven fabric produced in advance is cut to predetermined shape and dimension, thereby preparing a fourth layer 40.

After the first layer production step, the second layer preparation step, the third layer production step, and the fourth layer preparation step are completed, the second layer 20 prepared in the second layer preparation step is laminated on a surface of the first layer 10 obtained in the first layer production step, the surface being located on the first side S1, the third layer 30 obtained in the third layer production step is laminated on a surface of the second layer 20, the surface being located on the first side S1, and the fourth layer 40 prepared in the fourth layer preparation step is laminated on a surface of the third layer 30, the surface being located on the first side S1, thereby obtaining a sound insulation material 1 constituted by a laminated body of the first layer 10 to the fourth layer 40 (lamination step). The lamination step preferably allows the first layer 10, the second layer 20, the third layer 30, and the fourth layer 40 to be mutually fixed (for example, bonded or welded) among such layers, on at least respective parts thereof (for example, only the outer circumferential end portion of each of the layers). In a case where the first layer 10 to the fourth layer 40 are mutually welded, the second layer 20 and the fourth layer 40 are each preferably made from a material that can be thermally welded (in other words, can be dissolved or softened by heat and thus bonded to an adjacent layer). Thus, the first layer 10 to the fourth layer 40 can be mutually welded without use of any other member such as an adhesive. Herein, the first layer 10 to the fourth layer 40 are not optionally mutually fixed in the lamination step.

The sound insulation material 1 may also be produced by a method different from the above production method.

While the sound insulation material 1 of the example of FIG. 1 is described above, the sound insulation material 1 according to the first embodiment is not limited to that of the example of FIG. 1. For example, in the first embodiment, the first layer 10 to the fourth layer 40 may be each non-uniform in thickness. That is, the first layer 10 to the fourth layer 40 may be each non-flat.

Second Embodiment

Figure 4:
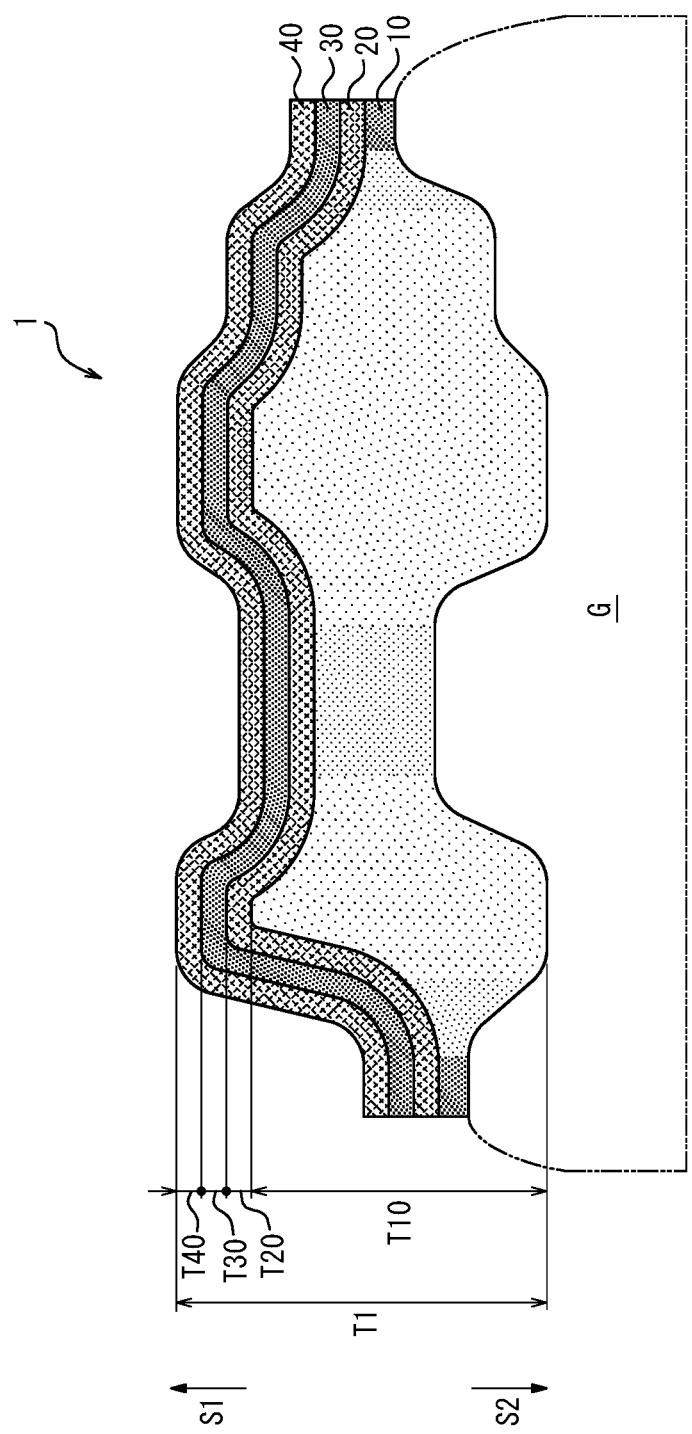
FIG. 4 is a cross-sectional view schematically illustrating a sound insulation material according to a second embodiment of the present disclosure.
Figure 5:
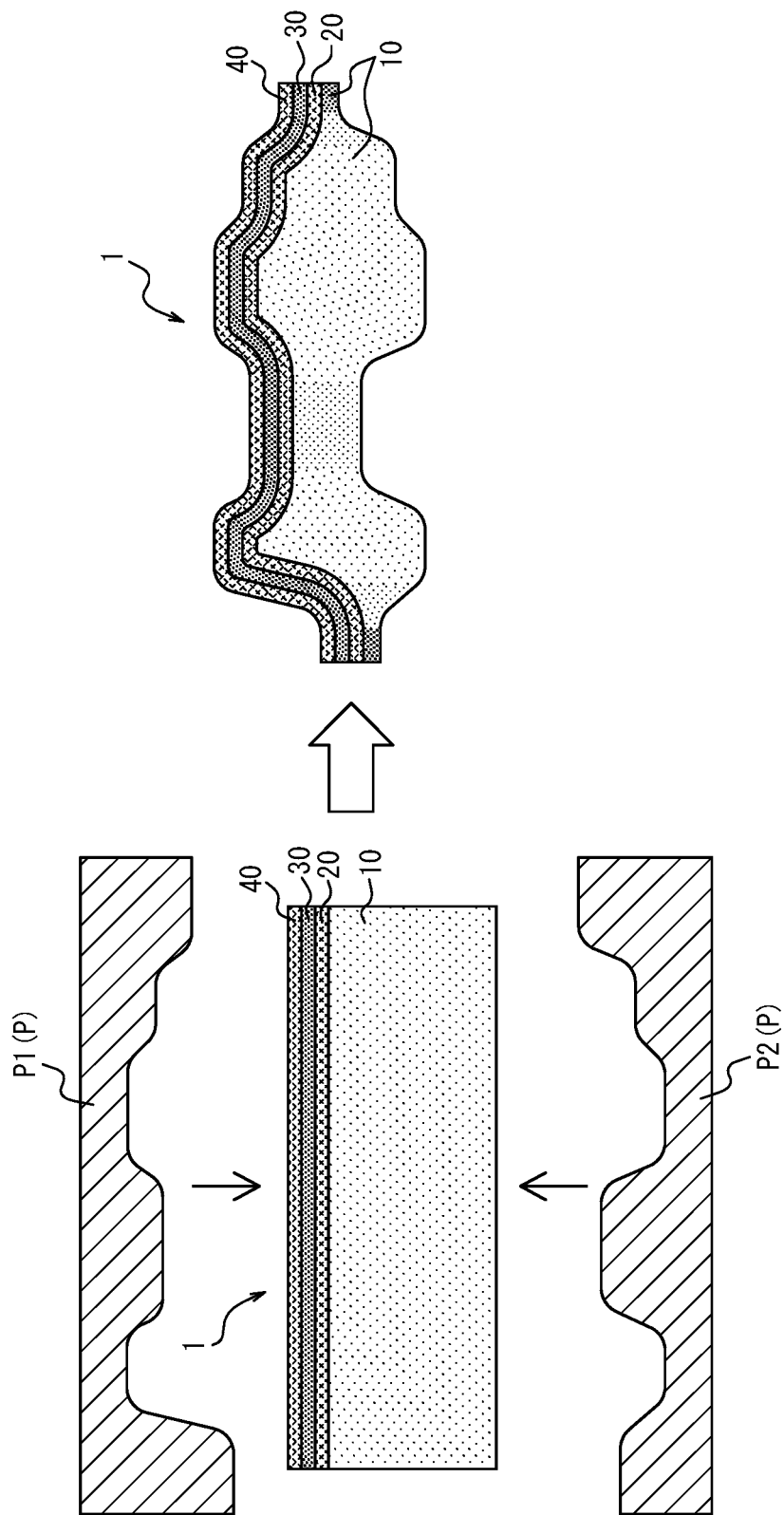
FIG. 5 is a view for describing a laminated body formation step in a method of producing a sound insulation material, according to the second embodiment of the present disclosure.

FIG. 4 and FIG. 5 are views describing a sound insulation material 1 and a method of producing the same, according to a second embodiment of the present disclosure.

FIG. 4 illustrates a cross section of the sound insulation material 1 according to the second embodiment of the present disclosure. The sound insulation material 1 of the present embodiment corresponds to one obtained by performing thermal compression formation of the sound insulation material 1 according to the first embodiment (FIG. 5). FIG. 5 is a view for describing a laminated body formation step in the method of producing the sound insulation material according to the second embodiment of the present disclosure.

As illustrated in FIG. 5, the steps until the above lamination step in the method of producing the sound insulation material according to the second embodiment of the present disclosure can be performed in the same manner as in the first embodiment. In the example of FIG. 5, a laminated body (sound insulation material 1) obtained in the lamination step has the configuration in FIG. 1.

In the method of producing the sound insulation material according to the present embodiment, the laminated body (sound insulation material 1) obtained in the lamination step is subjected to thermal compression formation in a laminated body formation step after the lamination step. The thermal compression formation may be performed by, for example, using a press mold P including a first mold part P1 having a molding surface configured so as to form a surface of the laminated body (sound insulation material 1), the surface being located on the first side S1, and a second mold part P2 having a molding surface configured so as to form a surface of the laminated body (sound insulation material 1), the surface being located on the second side S2, and compressing the laminated body (sound insulation material 1) between the first mold part P1 and the second mold part P2, with heating. Thus, the first layer 10 is thermally compressed in at least one part thereof, and not only is decreased in thickness, but also is higher in density. The second layer 20 to the fourth layer 40, although can be each thermally compressed and thus slightly decreased in thickness, are each slight in degree of such a decrease as compared with that of the first layer 10.

The first layer 10 (hence the first polyurethane foam) in the laminated body (sound insulation material 1, FIG. 4) after the laminated body formation step is at least partially thermally compressed, as described above, and the first layer 10 is non-uniform in thickness and density. In the present embodiment, the third layer 30, over its entirety, has a higher density than the density of at least a portion (preferably, the entirety) of the first layer 10 after the laminated body formation step. In other words, the first layer 10 has a portion lower in density than the density (more specifically, the minimum value of the density) of the third layer 30, after the laminated body formation step. Thus, sound absorption performance of the first layer 10 obtained in the first layer production step can be inhibited from being deteriorated due to such a subsequent laminated body formation step.

It is preferable from the same viewpoint that the average density of the first layer 10 be lower in the average density of the third layer 30 in the laminated body (sound insulation material 1) after the laminated body formation step.

It is also preferable from the same viewpoint that the first layer 10 have a portion not thermally compressed, in the laminated body (sound insulation material 1) after the laminated body formation step.

According to the second embodiment, the sound insulation material 1 (laminated body) can be formed into a desired shape by performing thermal compression formation of the laminated body (sound insulation material 1) in the laminated body formation step. Accordingly, for example, in a case where a surface of the sound source generator G, the surface facing the sound insulation material 1 (being located on the first side S1), is non-flat (has an uneven shape) as illustrated in FIG. 4, the shape of a surface of the sound insulation material 1 (laminated body), the surface being located on the second side S2, can be formed so as to be along with the shape of the surface of the sound source generator G, the surface facing the sound insulation material 1 (being located on the first side S1), resulting in an increase in area of contact between the sound insulation material 1 and the sound source generator G. Thus, sound insulation performance of the sound insulation material 1 can be enhanced. The sound insulation material 1 can also be more stably placed on the sound source generator G.

The third layer 30 in the laminated body (the sound insulation material 1 of the second embodiment) after the laminated body formation step can be made so as to, over its entirety, have a higher density than the density of at least a portion (preferably, the entirety) of the first layer 10, resulting in an enhancement in sound insulation performance of the sound insulation material 1 as in the first embodiment, although there is any difference in degree of such an enhancement.

It is preferable in the production method according to the second embodiment not to mutually fix (bond or weld) the first layer 10 to the fourth layer 40 in the lamination step, but to mutually at least partially weld the first layer 10 to the fourth layer 40 by heat in thermal compression formation in the subsequent laminated body formation step. Thus, thermal compression formation and mutual welding of the respective layers can be performed in one step, and thus productivity can be enhanced.

In a case where the first layer 10 to the fourth layer 40 are mutually welded, the second layer 20 and the fourth layer 40 are each preferably made from a material that can be thermally welded (in other words, can be dissolved or softened by heat and thus bonded to an adjacent layer). Thus, the first layer 10 to the fourth layer 40 can be mutually welded without use of any other member such as an adhesive.

In a case where the first layer 10 to the fourth layer 40 are mutually welded, the laminated body (sound insulation material 1) is largely compressed on a portion of such welding to result in a decrease in thickness, thereby allowing heat to be easily transferred to the respective layers 10 to 40 and easily allowing for such welding, but the first layer 10 is mainly decreased in thickness corresponding to such a decrease by thermal compression, and sound absorption performance of first layer 10, and by extension sound insulation performance of the sound insulation material 1, is likely to be deteriorated. Accordingly, the first layer 10 to the fourth layer 40 are mutually welded more preferably on only a portion of each of the layers (for example, on only the outer circumferential end portion of each of the layers). Thus, any portion where the first layer 10 to the fourth layer 40 are not mutually welded can be ensured in the sound insulation material 1, the amount of thermal compression of the first layer 10 can be reduced by the amount with respect to such portion, and sound absorption performance of the first layer 10, and by extension sound insulation performance of the sound insulation material 1, can be enhanced.

Hereinafter, preferable numerical value ranges of the dimension and physical properties of each of the layers of the sound insulation material 1 described above in the first and second embodiments will be described. The numerical value ranges are particularly preferable in a case where the sound insulation material 1 is used in a vehicle as in the present example.

In each of the above-mentioned examples, the maximum value of the thickness T1 (FIG. 1, FIG. 4) of the sound insulation material 1 is preferably 10 mm or more, more preferably 15 mm or more from the viewpoint of an enhancement in sound insulation performance.

The maximum value of the thickness T1 of the sound insulation material 1 is preferably 30 mm or less, more preferably 25 mm or less from the viewpoint of suppression of increases in weight and thickness of the sound insulation material 1.

In each of the above-mentioned examples, the thickness T10 (FIG. 1, FIG. 4) of at least a portion (preferably, the entirety) of the first layer 10 constituted by the first polyurethane foam is preferably higher than the maximum value of the thickness T30 (FIG. 1, FIG. 4) of the third layer 30 constituted by the third polyurethane foam, from the viewpoint of not only suppression of an increase in weight of the sound insulation material 1, but also an enhancement in sound insulation performance.

The thickness T10 of at least a portion (preferably, the entirety) of the first layer 10 is preferably 10 to 50 times the maximum value of the thickness T30 of the third layer 30, from the same viewpoint.

In each of the above-mentioned examples, the thickness T10 (FIG. 1, FIG. 4) of at least a portion (preferably, the entirety) of the first layer 10 is preferably 0.50 times or more, more preferably 0.70 times or more the maximum value of the thickness T1 (FIG. 1, FIG. 4) of the sound insulation material 1, from the viewpoint of an enhancement in sound absorption performance of the first layer 10, and consequently an enhancement in sound insulation performance of the sound insulation material 1. The thickness T10 of at least a portion (preferably, the entirety) of the first layer 10 is preferably 8 mm or more, more preferably 12 mm or more, from the same viewpoint.

The maximum value of the thickness T10 of the first layer 10 is preferably 0.90 times or less the maximum value of the thickness T1 of the sound insulation material 1, more preferably 0.86 times or less the maximum value of the thickness T1 of the sound insulation material 1, from the viewpoint of suppression of increases in weight and thickness of the first layer 10, and by extension the sound insulation material 1. The maximum value of the thickness T10 of the first layer 10 is preferably 25 mm or less, more preferably 20 mm or less, from the same viewpoint.

In each of the above-mentioned examples, the minimum value of the thickness T30 (FIG. 1, FIG. 4) of the third layer 30 is preferably 0.025 times or more the maximum value of the thickness T1 (FIG. 1, FIG. 4) of the sound insulation material 1, more preferably 0.045 times or more the maximum value of the thickness T1 of the sound insulation material 1, from the viewpoint of an enhancement in sound shielding performance of the third layer 30, and by extension an enhancement in sound insulation performance of the sound insulation material 1. The minimum value of the thickness T30 of the third layer 30 is preferably 0.5 mm or more, more preferably 0.8 mm or more, from the same viewpoint.

The maximum value of the thickness T30 of the third layer 30 is preferably 0.15 times or less the maximum value of the thickness T1 of the sound insulation material 1, more preferably 0.075 times or less the maximum value of the thickness T1 of the sound insulation material 1, from the viewpoint of suppression of increases in weight and thickness of the third layer 30, and by extension the sound insulation material 1. The maximum value of the thickness T20 of the third layer 30 is preferably 5 mm or less, more preferably 3 mm or less, further preferably 1.5 mm or less from the same viewpoint of a decrease in weight.

In a case where the sound insulation material 1 includes a fourth layer 40 (a surface layer located on the first side S1) constituted by a non-woven fabric as in each of the examples of FIG. 1 and FIG. 4, the thickness T40 of the fourth layer 40 is preferably 0.5 mm or more, more preferably 1 mm or more, from the viewpoint of enhancements in oil resistance and heat resistance of the fourth layer 40, and by extension the sound insulation material 1.

The thickness T40 of the fourth layer 40 is preferably 5 mm or less, more preferably 3 mm or less, from the viewpoint of suppression of increases in weight and thickness of the fourth layer 40, and by extension the sound insulation material 1.

In each of the above-mentioned examples, at least a portion (preferably, the entirety) of the first layer 10 (hence the first polyurethane foam) preferably has a density of 20 kg/m$^3$ or less, more preferably 15 kg/m$^3$ or less, from the viewpoint of an enhancement in sound absorption performance and a decrease in weight of the first layer 10. In a case where at least a portion (preferably, the entirety) of the first layer 10 (hence the first polyurethane foam) has a density of 20 kg/m$^3$ or less, sound absorption performance of any sound at a high frequency of about 5000 to 10000 Hz is enhanced. Such an enhancement is preferable particularly when the sound insulation material 1 is used in a vehicle.

The entirety of the first layer 10 (hence the first polyurethane foam) preferably has a density of 6 kg/m$^3$ or more, more preferably 10 kg/m$^3$ or more, from the viewpoint of ease of production of the first layer 10.

The "density" of the polyurethane foam herein refers to the density (apparent density) measured according to JIS K 6400-1:2004.

The first layer 10 (hence the first polyurethane foam) preferably is constituted by a flexible polyurethane foam having an open-cell structure where cells are in communication with each other, from the viewpoint of an enhancement in sound absorption performance and a decrease in weight of the first layer 10.

In each of the above-mentioned examples, at least a portion (preferably, the entirety) of the first layer 10 (hence the first polyurethane foam) preferably has an air permeability of 0.1 to 40 ml/cm$^2$/sec, more preferably 5 to 30 ml/cm$^2$/sec, from the viewpoint of an enhancement in sound absorption performance and a decrease in weight of the first layer 10.

The "air permeability" (amount of air permeation) of each polyurethane foam is herein measured at a thickness of 10 mm with a fragile type according to JIS K 6400-7:2012.

In each of the examples of FIG. 1 and FIG. 4, the fourth polyurethane foam constituting the block 130 (FIG. 2) before thermal compression of the third layer 30 in the third layer production step is different in composition (and thus density and air permeability) from the first polyurethane foam constituting the first layer 10 obtained in the first layer production step. However, the fourth polyurethane foam may have the same composition (and thus density and air permeability) as that of the first polyurethane foam constituting the first layer 10 obtained in the first layer production step.

In each of the above-mentioned examples, the fourth polyurethane foam preferably has a density of 6 kg/m$^3$ or more, more preferably 10 kg/m$^3$ or more, from the viewpoint of an enhancement in sound shielding performance of the third layer 30. The density of the fourth polyurethane foam is preferably higher than the density of the first polyurethane foam constituting the first layer 10 obtained in the first layer production step, from the same viewpoint.

The fourth polyurethane foam preferably has a density of 100 kg/m$^3$ or less, more preferably 90 kg/m$^3$ or less, from the viewpoint of suppression of an increase in weight of the third layer 30.

In each of the above-mentioned examples, the air permeability of the fourth polyurethane foam is preferably lower than the air permeability of the first polyurethane foam constituting the first layer 10 obtained in the first layer production step, from the viewpoint of an enhancement in sound shielding performance and a decrease in weight of the third layer 30. The air permeability of the fourth polyurethane foam is preferably 0.05 to 30 ml/cm$^2$/sec, more preferably 3 to 20 ml/cm$^2$/sec, from the same viewpoint.

The fourth polyurethane foam may be a flexible polyurethane foam having an open-cell structure where cells are in communication with each other, or may be a rigid polyurethane foam having a closed-cell structure where cells are not in communication with each other, but independent from each other.

In each of the above-mentioned examples, the third polyurethane foam constituting the third layer 30 is preferably one obtained by thermally compressing the block 130 (FIG. 2) constituted by the fourth polyurethane foam not thermally compressed, to 0.3 times or less the volume of the block, more preferably such one obtained by thermally compressing the block to 0.15 times or less the volume of the block, from the viewpoint of an enhancement in sound shielding performance of the third layer 30.

The third polyurethane foam constituting the third layer 30 is preferably one obtained by thermally compressing the block 130 (FIG. 2) constituted by the fourth polyurethane foam, to 0.05 times or more the volume of the block, more preferably such one obtained by thermally compressing the block to 0.10 times or more the volume of the block, from the viewpoint of the time and cost taken for a thermal compression operation of the third layer 30.

In each of the above-mentioned examples, the minimum value (the density of a portion having the lowest density; the same applies to the following.) of the density of the third layer 30 (hence the third polyurethane foam) is preferably 100 kg/m$^3$ or more, more preferably 300 kg/m$^3$ or more, from the viewpoint of an enhancement in sound shielding performance of the third layer 30. The minimum value of the density of the third layer 30 (hence the third polyurethane foam) is preferably 8 times or more, more preferably 17 times or more the minimum value of the density of the first layer 10 (hence the first polyurethane foam), from the same viewpoint.

The maximum value (the density of a portion having the highest density; the same applies to the following.) of the density of the third layer 30 (hence the third polyurethane foam) is preferably 1000 kg/m$^3$ or less, more preferably 500 kg/m$^3$ or less, from the viewpoint of suppression of an increase in weight of the third layer 30. The maximum value of the density of the third polyurethane foam constituting the third layer 30 is preferably 50 times or less, more preferably 33 times or less the minimum value of the density of the first layer 10 (hence the first polyurethane foam), from the same viewpoint.

In a case where the third polyurethane foam constituting the third layer 30 satisfies the foregoing numerical value range, the third layer 30 can preferably achieve both sound shielding performance and a decrease in weight.

In each of the above-mentioned examples, the air permeability of the third layer 30 (hence the third polyurethane foam) is preferably lower than the air permeability of at least a portion of the first layer 10 (hence the first polyurethane foam), from the viewpoint of an enhancement in sound shielding performance of the third layer 30. The third layer 30 (hence the third polyurethane foam) preferably has almost no or no air permeability, from the same viewpoint.

The third polyurethane foam constituting the third layer 30 may be a usual polyurethane foam not thermally compressed, and is favorably a polyurethane foam thermally compressed because the density of the third polyurethane foam in production can be simply and certainly increased.

The first polyurethane foam constituting the first layer 10 is preferably one obtained by reacting and foaming a liquid halogenated olefin-containing composition for polyurethane foam production, in the first layer production step. This enables an enhancement in sound absorption effect and a decrease in weight of the first layer 10.

The fourth polyurethane foam before thermal compression of the third layer 30 in the third layer production step may be one obtained by reacting and foaming a liquid halogenated olefin-containing composition for polyurethane foam production.

Hereinafter, the composition for polyurethane foam production will be described in more detail.

Composition for Polyurethane Foam Production

The composition for polyurethane foam production is preferably one (hereinafter, referred to as "composition A for polyurethane foam production".) which contains a polyol, a polyisocyanate, a catalyst, a foaming agent, a foam stabilizer, and an auxiliary foaming agent, which contains water as the foaming agent, the content of water being 4 to 11 parts by mass based on 100 parts by mass of the polyol, and which contains a liquid halogenated olefin as the auxiliary foaming agent, the content of the liquid halogenated olefin being 10 to 30 parts by mass based on 100 parts by mass of the polyol.

The composition A for polyurethane foam production allows a polyurethane foam which not only is low in density and light in weight, but also has a high sound absorption ability, to be provided, and furthermore is also excellent in production suitability.

The mechanism of exerting such effects, although is not clear, is partially presumed as follows. That is, it is presumed that a specific amount of water as the foaming agent is contained to thereby provide a polyurethane foam excellent in foamability, low in density, and light in weight. It is also presumed that a specific amount of the liquid halogenated olefin as the foaming aid is contained to thereby impart a high sound absorption ability.

<Polyol>

The composition A for polyurethane foam production contains a polyol. The polyol is not particularly limited as long as it is a compound having two or more hydroxyl groups in one molecule.

The polyol here used is, for example, a polyether polyol or a polyester polyol. In particular, a polyether polyol is preferable because of being capable of enhancing sound absorption ability. A polyether polyol further has also the advantages of being excellent in reactivity with a polyisocyanate and of being not hydrolyzed unlike a polyester polyol.

The polyether polyol here used is, for example, polypropylene glycol, polytetramethylene glycol, a polyether polyol made of a polymer obtained by addition polymerization of propylene oxide and ethylene oxide to a polyhydric alcohol, or a modified product thereof. Examples of the polyhydric alcohol include glycerin and dipropylene glycol. Examples of the polyether polyol specifically include a triol obtained by addition polymerization of propylene oxide to glycerin and furthermore addition polymerization of ethylene oxide thereto, and a diol obtained by addition polymerization of propylene oxide to dipropylene glycol and furthermore addition polymerization of ethylene oxide thereto.

The polyether polyol encompasses a polyether ester polyol. Such a polyether ester polyol is obtained by reacting a polycarboxylic acid anhydride and a compound having a cyclic ether group with a polyoxyalkylene polyol. Examples of the polyoxyalkylene polyol include polyethylene glycol, polypropylene glycol, and a propylene oxide adduct of glycerin. Examples of the polycarboxylic acid anhydride include respective anhydrides of succinic acid, adipic acid, and phthalic acid. Examples of the compound (alkylene oxide) having a cyclic ether group include ethylene oxide and propylene oxide.

The polyester polyol here used is, for example, any of a fused polyester polyol obtained by reacting a polycarboxylic acid such as adipic acid or phthalic acid with a polyol such as ethylene glycol, diethylene glycol, propylene glycol, or glycerin, and also a lactone-based polyester polyol and a polycarbonate-based polyol. Such polyols can be each changed in the number of hydroxyl functional groups and the hydroxyl value by adjusting the type, the molecular weight, the degree of fusion, and/or the like of a raw material component.

Among them, the polyol is preferably a polyether polyol, particularly preferably a polypropylene glycol-based polyether polyol produced by adding a propylene oxide group to a higher alcohol. The number-average molecular weight of the polypropylene glycol-based polyether polyol is preferably 500 or more, more preferably 1,000 or more, further preferably 2,000 or more, and preferably 15,000 or less, more preferably 8,000 or less, further preferably 4,000 or less.

The number-average molecular weight and the weight-average molecular weight are measured by a GPC (gel permeation chromatography) method, and are determined in terms of standard polystyrene.

<Polyisocyanate>

The composition A for polyurethane foam production contains a polyisocyanate. The polyisocyanate is not particularly limited as long as it is a compound having two or more isocyanato groups (also referred to as "isocyanate groups".) in one molecule.

Specifically, for example, tolylene diisocyanate (TDI), 4,4-diphenylmethane diisocyanate (MDI), 1,5-naphthalene diisocyanate (NDI), triphenylmethane triisocyanate, xylylene diisocyanate (XDI), hexamethylene diisocyanate (HDI), dicyclohexylmethane diisocyanate, isophorone diisocyanate (IPDI), or any modified product thereof, such as an adduct compound, an isocyanurate compound, or a buret compound is used.

In particular, the polyisocyanate preferably contains 70% by mass or more, more preferably 80% by mass or more, further preferably 90% by mass or more of a tolylene diisocyanate compound relative to the entire polyisocyanate, and the total amount of the polyisocyanate particularly preferably corresponds to a tolylene diisocyanate compound.

The tolylene diisocyanate compound may be 2,4-tolylene diisocyanate, 2,6-tolylene diisocyanate, or a mixture thereof. The tolylene diisocyanate compound may also be an isocyanurate compound of tolylene diisocyanate or an adduct compound (for example, a trifunctionalized compound) of tolylene diisocyanate, and is particularly preferably 2,4-tolylene diisocyanate, 2,6-tolylene diisocyanate, or a mixture thereof.

The isocyanate index of the polyisocyanate may be 100 or less or more than 100, and is preferably 80 or more, and preferably 130 or less, more preferably 110 or less. In a case where the isocyanate index is 80 or more, the resulting foamed body is preferable in hardness and excellent in mechanical properties such as residual compression strain. On the other hand, the isocyanate index is preferably 130 or less because heat buildup in production of such a foamed body is suppressed and coloration of such a foamed body is suppressed. The isocyanate index is here the equivalent ratio of an isocyanate group of the polyisocyanate to an active hydrogen group of the polyol, water as the foaming agent, and/or the like, as expressed by the percentage. Accordingly, an isocyanate index of more than 100 means an excess of the polyisocyanate as compared with the polyol and the like.

<Catalyst>

The composition A for polyurethane foam production contains a catalyst. The catalyst promotes a urethanization reaction of the polyol and the polyisocyanate, a foaming reaction of water as the foaming agent and the polyisocyanate, and/or the like, and may be appropriately selected from conventionally known compounds.

Specifically, for example, a tertiary amine such as triethylenediamine, dimethylethanolamine, or N,N',N'-trimethylaminoethylpiperazine, an organometal compound (metal catalyst) such as tin octylate or dibutyltin dilaurate, an acetic acid salt, or an alkali metal alcoholate is used.

The catalyst is preferably used in combination with an amine catalyst and a metal catalyst in order to enhance the effects thereof. The content of the amine catalyst is preferably 0.01 parts by mass or more, more preferably 0.2 parts by mass or more, and preferably 0.7 parts by mass or less, more preferably 0.6 parts by mass or less, per 100 parts by mass of the polyol. In a case where the content of the amine catalyst is in the range, the urethanization reaction and the foaming reaction can be promoted sufficiently in a well-balanced manner.

The content of the metal catalyst is preferably 0.05 parts by mass or more, more preferably 0.1 parts by mass or more, and preferably 0.5 parts by mass or less, more preferably 0.4 parts by mass or less, per 100 parts by mass of the polyol. In a case where the content of the metal catalyst is in the range, the urethanization reaction and the foaming reaction are made in a well-balanced manner, foaming can be favorably performed, and a foamed body is excellent in strain properties.

<Foaming Agent>

The composition A for polyurethane foam production contains a foaming agent, and contains water as the foaming agent. The foaming agent is to foam a polyurethane resin, thereby providing a polyurethane foam.

The content of water is 4 to 11 parts by mass based on 100 parts by mass of the polyol. In a case where the content of water is less than 4 parts by mass based on 100 parts by mass of the polyol, foaming by the foaming reaction is insufficient and the density of a foamed body is increased. In a case where the content of water is more than 11 parts by mass based on 100 parts by mass of the polyol, the heat of a reaction of water and the polyisocyanate is increased, the temperature upon foaming is increased, controlling is difficult to make, and burning (scorching) in a foamed body is easily caused.

The content of water is preferably 4.5 parts by mass or more, more preferably 5.0 parts by mass or more, further preferably 5.5 parts by mass or more, and preferably 10.0 parts by mass or less, more preferably 9.0 parts by mass or less, further preferably 8.0 parts by mass or less, based on 100 parts by mass of the polyol.

The composition A for polyurethane foam production may contain any foaming agent other than water, and preferably contains only water as the foaming agent. In a case where a foaming agent other than water is contained, the content of such foaming agent other than water is preferably 50% by mass or less, more preferably 30% by mass or less, further preferably 10% by mass or less based on the content of water, and particularly preferably no foaming agent other than water is contained.

<Foam Stabilizer>

The composition A for polyurethane foam production contains a foam stabilizer. The foam stabilizer is used for smoothly progressing foaming performed by the foaming agent. The foam stabilizer here used can be one usually used in production of a flexible polyurethane foamed body. Specifically, the foam stabilizer here used is, for example, a silicone compound, an anionic surfactant such as sodium dodecylbenzenesulfonate or sodium lauryl sulfate, polyethersiloxane, or a phenol-based compound.

The content of the foam stabilizer is preferably 1.0 to 8.0 parts by mass per 100 parts by mass of the polyol. In a case where the content is 1.0 part by mass or more, the foam stabilization action upon foaming of a raw material of a foamed body is sufficiently exhibited and a favorable foamed body can be obtained. In a case where the content is 8.0 parts by mass or less, the foam stabilization action is properly exhibited and communication properties of cells are retained in a proper range.

The foam stabilizer preferably contains a non-reactive silicone and a reactive silicone. Both the silicones are used in combination, thereby providing excellent foamability. The reactive silicone here refers to a silicone compound (polysiloxane compound) having at least one reactive group selected from the group consisting of an amino group, an epoxy group, a hydroxyl group, a mercapto group, and a carboxy group in a main chain terminal or in a side chain.

The reactive silicone is a compound obtained by introducing a reactive group selected from the group consisting of an amino group, an epoxy group, a hydroxyl group, a mercapto group, and a carboxy group, or a group having the reactive group, into a side chain or a main chain terminal of a silicone compound such as dimethylsilicone, methylphenylsilicone, or methyl hydrogen silicone. In particular, a reactive silicone having a hydroxyl group or a carboxy group as the reactive group is preferable, and a reactive silicone having a carboxy group as the reactive group is more preferable.

A commercially available product may be used as the reactive silicone, examples thereof include various respective reactive silicones manufactured by, for example, Shin-Etsu Chemical Co., Ltd., Dow Toray Co., Ltd., and Momentive Performance Materials, and specific examples of the reactive silicone having a carboxy group include CF1218 (manufactured by Dow Toray Co., Ltd.) and X22-3701 (manufactured by Shin-Etsu Chemical Co., Ltd.). Examples of the reactive silicone having a hydroxyl group include SF 8427, BY 16-201 and SF 8428 (these are manufactured by Dow Toray Co., Ltd.), and X-22-4039 and X-22-4015 (these are manufactured by Shin-Etsu Chemical Co., Ltd.).

The non-reactive silicone is not particularly limited as long as it does not have any reactive group, and may be any modified non-reactive silicone such as a polyether-modified, aralkyl-modified, or long chain alkyl-modified non-reactive silicone. A commercially available product may be used as the non-reactive silicone, and may be appropriately selected from various respective products commercially available from, for example, Shin-Etsu Chemical Co., Ltd., Dow Toray Co., Ltd., and Momentive Performance Materials.

The content of the non-reactive silicone is preferably 2.0 parts by mass or more, more preferably 2.5 parts by mass or more, further preferably 3.0 parts by mass or more, more further preferably 3.5 parts by mass or more, and preferably 5.0 parts by mass or less, and more preferably 4.5 parts by mass or less based on 100 parts by mass of the polyol. The content of the non-reactive silicone is preferably in the range because a polyurethane foam excellent in sound absorption ability is obtained.

The content of the reactive silicone is preferably 1.0 part by mass or more, more preferably 1.5 parts by mass or more, further preferably 2.0 parts by mass or more, and preferably 3.0 parts by mass or less based on 100 parts by mass of the polyol. The content of the reactive silicone is preferably in the range because a polyurethane foam excellent in sound absorption ability is obtained.

<Auxiliary Foaming Agent>

The composition A for polyurethane foam production contains an auxiliary foaming agent. The auxiliary foaming agent is also referred to as "foaming aid", and is to aid foaming by the foaming agent, resulting in adjustment of the density of a foamed body. The composition A for polyurethane foam production contains a liquid halogenated olefin as the auxiliary foaming agent.

The "liquid halogenated olefin" here means a halogenated olefin which is liquid at 10° C., in other words, which has a boiling point of more than 10° C. Any olefin to be halogenated is preferably an α-olefin having 2 to 10 carbon atoms, more preferably an α-olefin having 2 to 6 carbon atoms, further preferably an α-olefin having 3 to 5 carbon atoms, particularly preferably an α-olefin having 3 or 4 carbon atoms, most preferably propene.

The liquid halogenated olefin is preferably a compound represented by Formula 1 below.

Formula 1

$$C_3H_gF_hX_i \qquad (1)$$

In Formula 1, each X independently represents a chlorine atom, a bromine atom, or an iodine atom, g represents an integer of 0 to 5, h represents an integer of 1 to 6, i represents an integer of 0 to 5, and g+h+i=6 is satisfied.

In Formula 1, each X independently represents a chlorine atom, a bromine atom, or an iodine atom, preferably represents a chlorine atom or a bromine atom, more preferably represents a chlorine atom.

g represents an integer of 0 to 5, preferably 1 to 4, more preferably 1 to 3. h represents an integer of 1 to 6, preferably 2 to 5, more preferably 2 to 4. i represents an integer of 0 to 5, preferably 0 to 4, more preferably 0 to 2.

The compound represented by Formula 1 is not particularly limited, and may be a cis-form or a trans-form, or a mixture thereof. Specific examples include 3-chloropentafluoropropene, 2-chloropentafluoropropene, 1-chloropentafluoropropene, 1,1-dichlorotetrafluoropropene, 1,2-dichlorotetrafluoropropene, 1,3-dichlorotetrafluoropropene, hexafluoropropene, 1-chloro-2,3,3,3-tetrafluoropropene, 1,3-dichloro-2,3,3-trifluoropropene, 1,2-dichloro-3,3,3-trifluoropropene, 1,1,3,3,3-pentafluoropropene, 1,2,3,3,3-pentafluoropropene, 2-chloro-3,3,3-trifluoropropene, 2,3,3,3-tetrafluoropropene, 1,2,3,3-tetrafluoropropene, 1,1,2-trifluoropropene, and any halogenated propene having a vinylene group, as exemplified below.

The compound represented by Formula 1 is preferably a compound having a vinylene group (—CH=CH—). Specifically, the compound is 3,3,3-trifluoropropene, 3-bromo-3,3-difluoropropene, 3-chloro-3,3-difluoropropene, 3-fluoropropene, or the compound exemplified below.

Specifically, the compound is preferably a compound represented by $CF_{3-m}Cl_mCH{=}CY$ (m represents an integer of 0 to 3 and Y represents a fluorine atom or a chlorine atom.) where halogen other than fluorine is chlorine, and such fluorinated propane here obtained is represented by $CF_{3-n}Cl_nCH_2CFYH_n$ (n represents an integer of 0 to 3 and Y represents a fluorine atom or a chlorine atom.) and has a methylene group (—CH$_2$—).

The compound represented by Formula 1 is more preferably fluorinated propene represented by $R^1$—CH=CH—$R^2$ (wherein, $R^1$ represents a trihalomethyl group and $R^2$ represents halogen.). Specific examples can include 3,3,3- trichloro-1-fluoropropene, 1,3,3-trichloro-3-fluoropropene, 3,3-dichloro-1,3-difluoropropene, 1,3-dichloro-3,3-difluoropropene, 3-chloro-1,3,3-trifluoropropene, 3-bromo-1,3,3-trifluoropropene, 1-iodo-3,3,3-trifluoropropene, 1-chloro-3,3,3-trifluoropropene, and 1,3,3,3-tetrafluoropropene. Among such fluorinated propenes, 1-chloro-3,3,3-trifluoropropene (trans-form or cis-form) and 1,3,3,3-tetrafluoropropene (trans-form or cis-form) are preferable, 1-chloro-3,3,3-trifluoropropene (trans-form or cis-form) is more preferable, and trans-1-chloro-3,3,3-trifluoropropene (boiling point 19 ° C.) is further preferable.

A commercially available product may be used as the liquid halogenated olefin, and examples include Solstice LBA (trans-1-chloro-3,3,3-trifluoropropene, manufactured by Honeywell International, Inc.). The liquid halogenated olefin may also be synthesized according to a known method, for example, a method described in Japanese Patent Laid-Open No. 2000-7591.

The content of the liquid halogenated olefin is 10 to 30 parts by mass based on 100 parts by mass of the polyol. In a case where the content of the liquid halogenated olefin is less than 10 parts by mass based on 100 parts by mass of the polyol, not only the effects of the auxiliary foaming agent are not sufficiently exerted and the apparent density of a foamed body is increased, but also the resulting polyurethane foam is harder. In a case where the content is more than 30 parts by mass, the apparent density of a foamed body is too lowered due to excessive foaming, and the strength of a resin backbone is reduced and the mechanical strength of a foamed body is reduced.

The content of the liquid halogenated olefin is preferably 11 parts by mass or more, more preferably 12 parts by mass or more, further preferably 13 parts by mass or more, and preferably 25 parts by mass or less, more preferably 20 parts by mass or less, further preferably 18 parts by mass or less, based on 100 parts by mass of the polyol.

The liquid halogenated olefin may be used singly or in combinations of two or more kinds thereof, and, in a case where two or more kinds thereof are used in combination, the total amount of such liquid halogenated olefins is preferably in the above range.

The composition A for polyurethane foam production may contain an auxiliary foaming agent other than the liquid halogenated olefin. Examples of such an auxiliary foaming agent other than the liquid halogenated olefin include liquefied carbon dioxide and an alkyl halide, and examples of the alkyl halide include difluoromethane, pentafluoroethane, 1,1,2,2-tetrafluoroethane, 1,1,1,2-tetrafluoroethane, difluoroethane, 1,1,1,2,3,3,3-heptafluoropropane, 1,1,1,3,3,3-hexafluoropropane, 1,1,1,3,3-pentafluoropropane, and 1,1,1,3,3-pentafluorobutane.

The content of the liquid halogenated olefin in the auxiliary foaming agent is preferably 50% by mass or more, more preferably 70% by mass or more, further preferably 90% by mass or more, particularly preferably 95% by mass or more based on the total mass of the auxiliary foaming agent, and most preferably, only the liquid halogenated olefin is contained as the auxiliary foaming agent.

<Other Raw Material Component>

The composition A for polyurethane foam production includes, if necessary, for example, a crosslinking agent, a flame retardant, a filler, a stabilizer, a colorant, and/or a plasticizer, which are/is compounded according to an ordinary method. Examples of the crosslinking agent include polyhydric alcohols such as ethylene glycol, glycerin, trimethylolpropane, and pentaerythritol, amines such as ethylenediamine and hexamethylenediamine, and aminoalcohols such as diethanolamine and triethanolamine. Examples of the flame retardant include tris-dichloropropyl phosphate, tris-chloroethyl phosphate, dibromoneopentyl alcohol, and tribromoneopentyl alcohol.

Production of Polyurethane Foam with Composition A for Polyurethane Foam Production Each polyurethane foam (first polyurethane foam and third polyurethane foam) is produced by reacting and foaming each component (raw material) of the composition A for polyurethane foam production, according to an ordinary method. In a case where such each polyurethane foam is produced, there is adopted any method of a one-shot method involving directly reacting the polyol and the polyisocyanate or a prepolymer method involving reacting the polyol and the polyisocyanate in advance to thereby provide a prepolymer having an isocyanate group at a terminal, and reacting the polyol therewith. There may be adopted any method of a slab foaming method involving reacting and foaming under a normal temperature and an atmospheric pressure and a mold foaming method involving injecting raw materials (reaction mixture liquid) of a polyurethane foamed body into a molding die, and performing clamping, and reaction and foaming in the die, and a slab foaming method is more preferable because a decrease in weight of such each polyurethane foam is easily realized.

A reaction of raw materials of such each polyurethane foam is complicated, and mainly includes a urethanization reaction by addition polymerization of the polyol and the polyisocyanate, a crosslinking reaction of the reaction product or the like and the polyisocyanate, and a foaming reaction of the polyisocyanate and the foaming agent.

EXAMPLES

Experiments and evaluations were made in Comparative Example 1 and Example 1 of the sound insulation material of the present disclosure. These will be hereinafter described with reference to FIG. 6 to FIG. 7.

Sound insulation material 1 of Example 1 is constituted by a laminate structure of four layers as in the example of FIG. 1. More specifically, sound insulation material 1 of Example 1 includes first layer 10 to fourth layer 40 each having a plate shape. First layer 10 is constituted by a polyurethane foam not thermally compressed, and has a density of 12 kg/m$^3$. Second layer 20 and fourth layer 40 each is constituted by a polyester non-woven fabric. Third layer 30 is obtained by thermally compressing a block of a polyurethane foam not thermally compressed, having a density of 35 kg/m$^3$, to a thickness (and thus volume) of 0.1 times in the thickness direction, and has a density of 350 kg/m$^3$. The entire thickness T1 of sound insulation material 1 of Example 1 is 22 mm.

Figure 7:
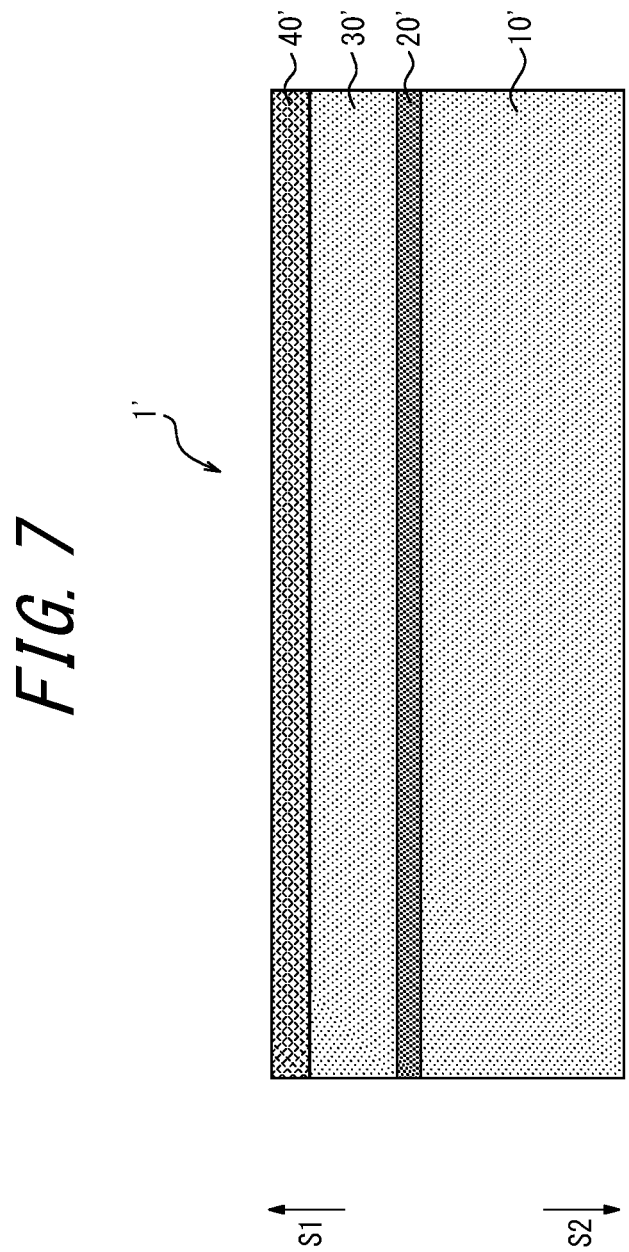
FIG. 7 is a cross-sectional view schematically illustrating a sound insulation material according to Comparative Example 1, used in the sound pressure test in FIG. 6.

Sound insulation material 1' of Comparative Example 1 is constituted by a laminate structure of four layers illustrated in FIG. 7. More specifically, sound insulation material 1' of Comparative Example 1 is constituted by first layer 10' to fourth layer 40' each having a plate shape. First layer 10' and third layer 30' each is constituted by a polyurethane foam not thermally compressed, and has a density of 12 kg/m$^3$. Second layer 20' is obtained by thermally compressing a block of a polyurethane foam not thermally compressed, having a density of 35 kg/m$^3$, to a thickness (and thus volume) of 0.1 times in the thickness direction, and has a density of 350 kg/m$^3$. Fourth layer 40' is constituted by a polyester non-woven fabric. The entire thickness of sound insulation material 1' of Comparative Example 1 is 22 mm.

A sound pressure test was performed by using those of Example 1 and Comparative Example 1.

The sound pressure test was performed in an anechoic chamber by use of a testing apparatus. The testing apparatus was configured so as to generate any sound in an aluminum box, and a microphone was disposed away at the upper side of the aluminum box. In the sound pressure test of each of sound insulation materials 1 and 1' in the Examples, any sound was generated in the aluminum box in a state where each of sound insulation materials 1 and 1' was disposed on the upper portion of the aluminum box, and the sound pressure (dB) was measured by the microphone.

Figure 6:
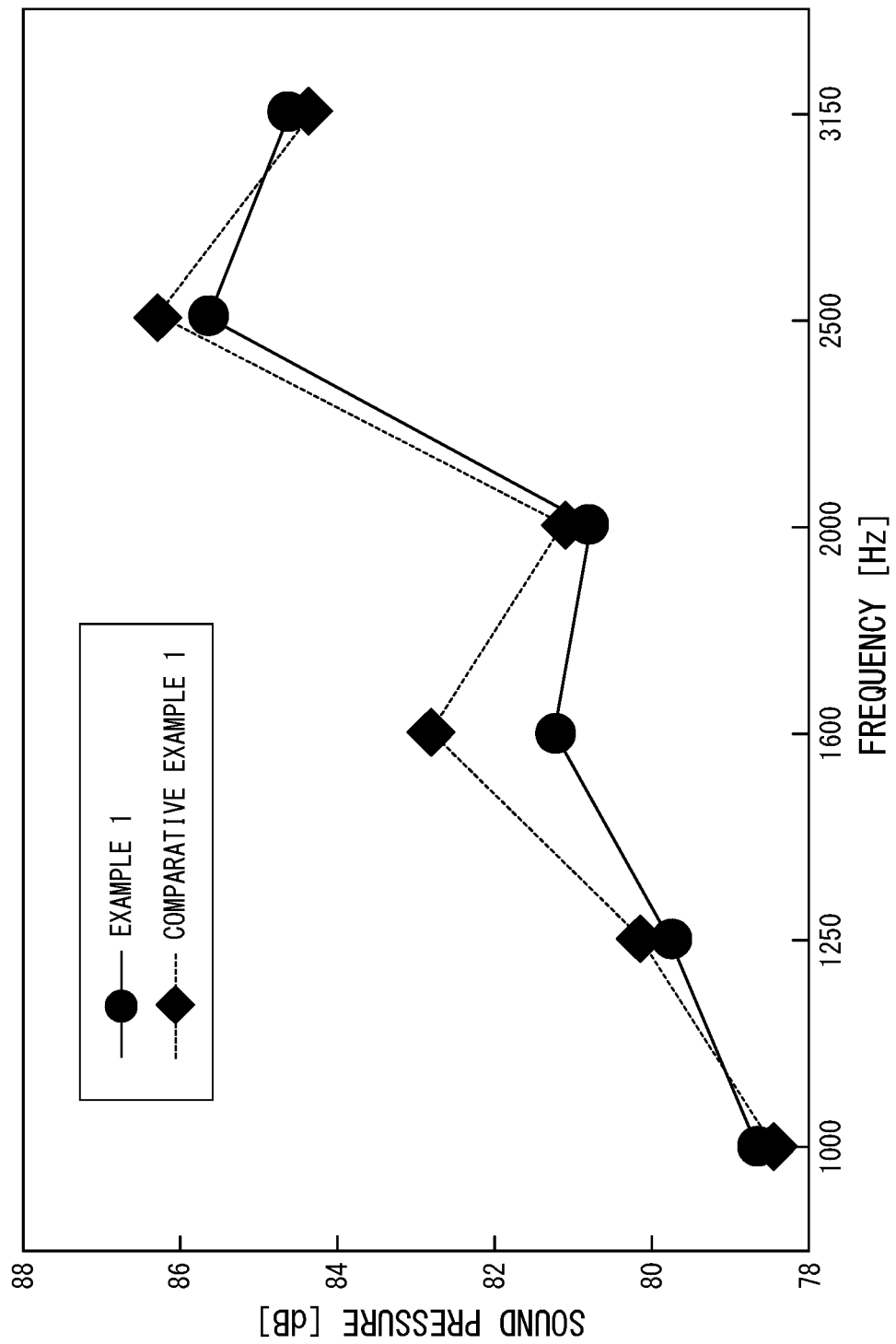
FIG. 6 is a diagram representing the sound pressure test results in Example 1 and Comparative Example 1 of the sound insulation material of the present disclosure.

The results of the sound pressure test are represented in FIG. 6. In FIG. 6, the horizontal axis represents the frequency (Hz) and the vertical axis represents the sound pressure (dB). The sound pressure is an index expressing sound insulation performance as a combination of sound absorption performance and sound shielding performance of the sound insulation material. A lower value of the sound pressure represents higher sound insulation performance as a combination of sound absorption performance and sound shielding performance of the sound insulation material.

As is clear from the results in FIG. 6, Example 1 exhibited a lower sound pressure in a wide range of frequency, and as a result exerted higher sound insulation performance, than Comparative Example 1. Comparative Example 1 exhibited an increased sound pressure with respect to any sound around 1600 Hz. The reason for this is considered to be because the respective polyurethane foams constituting first layer 10' to third layer 30' in Comparative Example 1 were resonated to thereby amplify the sound. Example 1 exhibited a lower sound pressure also with respect to any sound around 1600 Hz, than Comparative Example 1. The reason for this is considered to be because resonance between the respective polyurethane foams constituting first layer 10 and third layer 30 was inhibited by second layer 20 constituted by a polyester non-woven fabric, disposed between first layer 10 and third layer 30.

INDUSTRIAL APPLICABILITY

The sound insulation material of the present disclosure may be used in any location and/or article, and is preferably used in a vehicle.

REFERENCE SIGNS LIST 1, 1' sound insulation material
10, 10' first layer (surface layer at second side)
20, 20' second layer
30, 30' third layer
40, 40' fourth layer (surface layer at first side)
130 block constituted by fourth polyurethane foam
P press mold
P1 first mold part
P2 second mold part

The invention claimed is:

1. A sound insulation material comprising
a first layer constituted by a polyurethane foam,
a second layer that is laminated on a surface of the first layer, the surface being located on a first side, and that is constituted by a sheet-shaped member made from a material other than polyurethane,
a third layer that is laminated on a surface of the second layer, the surface being located on the first side, that comprises a polyurethane foam, and that, over its entirety, has a higher density than a density of at least a portion of the first layer,
wherein at least a portion of the first layer has a density of 15 kg/m³ or less,
the minimum value of the density of the third layer is 300 kg/m³ or more,
the second layer is constituted by a non-woven fabric, and
a thickness of at least a portion of the first layer is 10 to 50 times a maximum value of a thickness of the third layer.

2. The sound insulation material according to claim 1, wherein the third layer is constituted by a polyurethane foam thermally compressed.

3. The sound insulation material according to claim 2, wherein the polyurethane foam thermally compressed, constituting the third layer, is obtained by thermally compressing a polyurethane foam not thermally compressed, to 0.1 to 0.3 times by volume.

4. The sound insulation material according to claim 3, wherein a thickness of at least a portion of the first layer is more than a maximum value of a thickness of the third layer.

5. The sound insulation material according to claim 2, wherein a thickness of at least a portion of the first layer is more than a maximum value of a thickness of the third layer.

6. The sound insulation material according to claim 2, further comprising a surface layer located on the first side, the surface layer being located closest to the first side and is constituted by a non-woven fabric.

7. The sound insulation material according to claim 1, wherein a thickness of at least a portion of the first layer is more than a maximum value of a thickness of the third layer.

8. The sound insulation material according to claim 1, further comprising a surface layer located on the first side, the surface layer being located closest to the first side and is constituted by a non-woven fabric.

9. The sound insulation material according to claim 1, wherein the third layer is constituted by a polyurethane foam thermally compressed.

10. The sound insulation material according to claim 1, wherein a thickness of at least a portion of the first layer is more than a maximum value of a thickness of the third layer.

11. The sound insulation material according to claim 1, further comprising a surface layer located on the first side, the surface layer being located closest to the first side and is constituted by a non-woven fabric.

12. A method of producing a sound insulation material, comprising
a first layer production step of obtaining a first layer constituted by a polyurethane foam,
a second layer preparation step of preparing a second layer constituted by a sheet-shaped member made from a material other than polyurethane,
a third layer production step of thermally compressing a polyurethane foam not thermally compressed, thereby obtaining a third layer, over its entirety, having a higher density than a density of any portion of the first layer obtained in the first layer production step, and
a lamination step of laminating the second layer prepared in the second layer preparation step, on a surface of the first layer obtained in the first layer production step, the surface being located on a first side, and laminating the third layer obtained in the third layer production step, on a surface of the second layer, the surface being located on the first side, thereby obtaining a laminated body, wherein at least a portion of the first layer has a density of 15 kg/m³ or less, the minimum value of the density of the third layer is 300 kg/m³ or more, the second layer is constituted by a non-woven fabric, and a thickness of at least a portion of the first layer is 10 to 50 times a maximum value of a thickness of the third layer.

13. The method of producing a sound insulation material according to claim 12, wherein the first layer is obtained by reacting and foaming a liquid halogenated olefin-containing composition for polyurethane foam production, in the first layer production step.

14. The method of producing a sound insulation material according to claim 12, further comprising a laminated body formation step of forming the laminated body obtained in the lamination step, by thermal compression, wherein the third layer in the laminated body after the laminated body formation step, over its entirety, has a higher density than a density of at least a portion of the first layer.

* * * * *